United States Patent [19]

McMurtry

[11] Patent Number: 4,750,835

[45] Date of Patent: Jun. 14, 1988

[54] METHOD OF AND DEVICE FOR MEASURING DIMENSIONS

[75] Inventor: David R. McMurtry, Wotton-Under-Edge, England

[73] Assignee: Renishaw Electrical Limited, Wotton-under-Edge, England

[21] Appl. No.: 747,376

[22] Filed: Jun. 21, 1985

Related U.S. Application Data

[63] Continuation of Ser. No. 474,599, filed as PCT GB 82/00198, Jul. 7, 1982, published as WO 83/00216, Jan. 20, 1983, abandoned.

[30] Foreign Application Priority Data

Jul. 7, 1981 [GB] United Kingdom ................ 8120999

[51] Int. Cl.$^4$ ............................................. G01B 11/00
[52] U.S. Cl. ...................................... 356/375; 250/227
[58] Field of Search ................ 356/375, 372; 250/227, 250/202

[56] References Cited

U.S. PATENT DOCUMENTS

| | | | |
|---|---|---|---|
| 3,327,584 | 6/1967 | Kissinger | 356/375 |
| 3,497,694 | 2/1970 | Jura et al. | 250/202 |
| 3,771,873 | 11/1973 | Tourret | 250/227 |
| 3,788,741 | 1/1974 | Buechler | 356/4 |
| 3,840,739 | 10/1974 | Coulter | 250/202 |
| 3,918,814 | 11/1975 | Weisser | 356/375 |
| 3,940,608 | 2/1976 | Kissinger et al. | 250/227 |
| 4,358,960 | 11/1982 | Porter | 250/227 |

FOREIGN PATENT DOCUMENTS 2077421 12/1981 United Kingdom ................ 356/375

Primary Examiner—R. A. Rosenberger
Attorney, Agent, or Firm—Spencer & Frank

[57] ABSTRACT

The method for measuring dimensions of a workpiece (15) in a coordinate measuring machine having an optical probe (14) arranged to output radiation in a direction (21A) at an angle to a surface (15A) to be measured. The probe has a housing (17) which is arranged to lie clear of a projection formed by the surface (15A) to be measured and another, adjacent, surface (15B) so that the housing can pass clear of the projection and the measurement can be made without halting the machine at the surface to be measured.

The probe (14) is adapted for the radiation to be in the form of a cone (21) symmetric about an axis (Z1) transverse to the direction of movement of the probe so that the probe can sense all around the axis and therefore can sense any surface parallel or inclined to the axis regardless of the direction in which the surface faces.

7 Claims, 4 Drawing Sheets

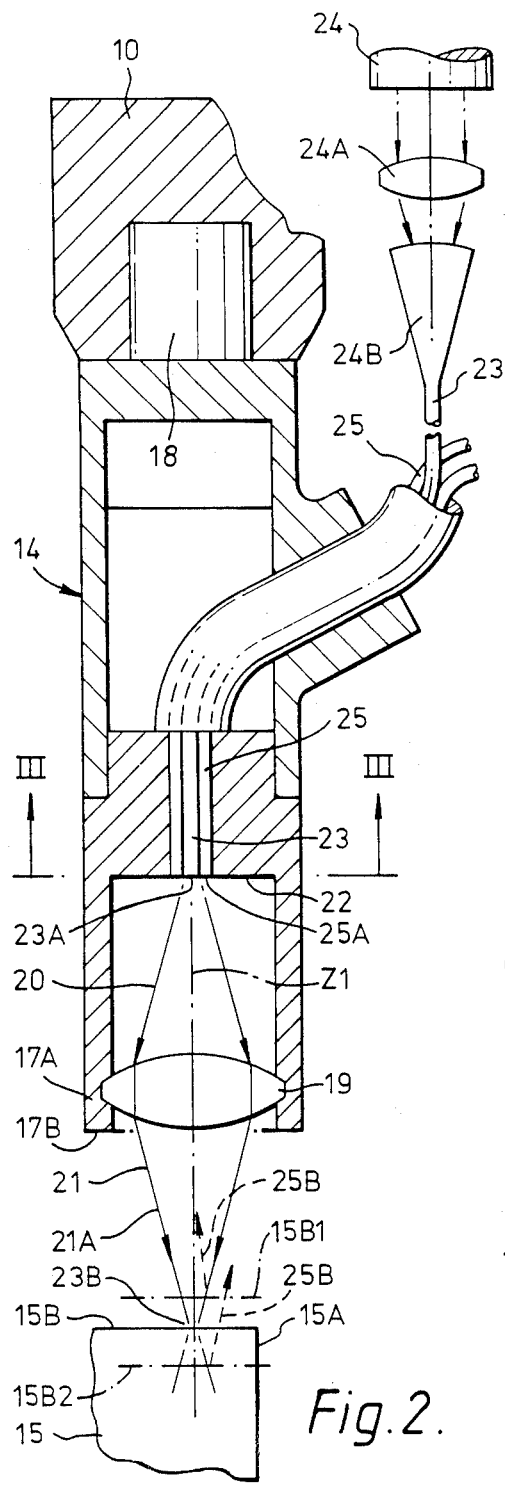
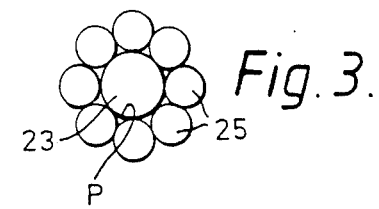
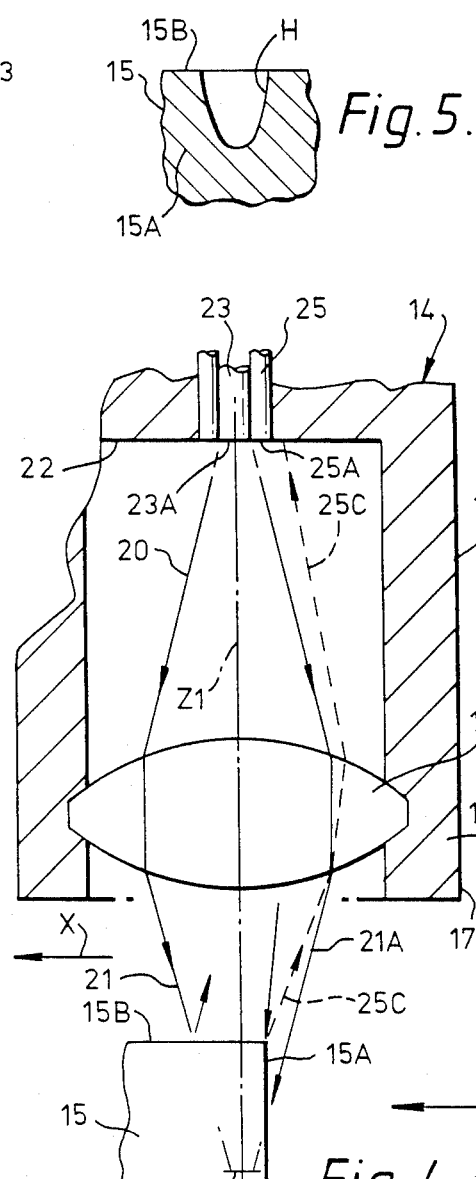

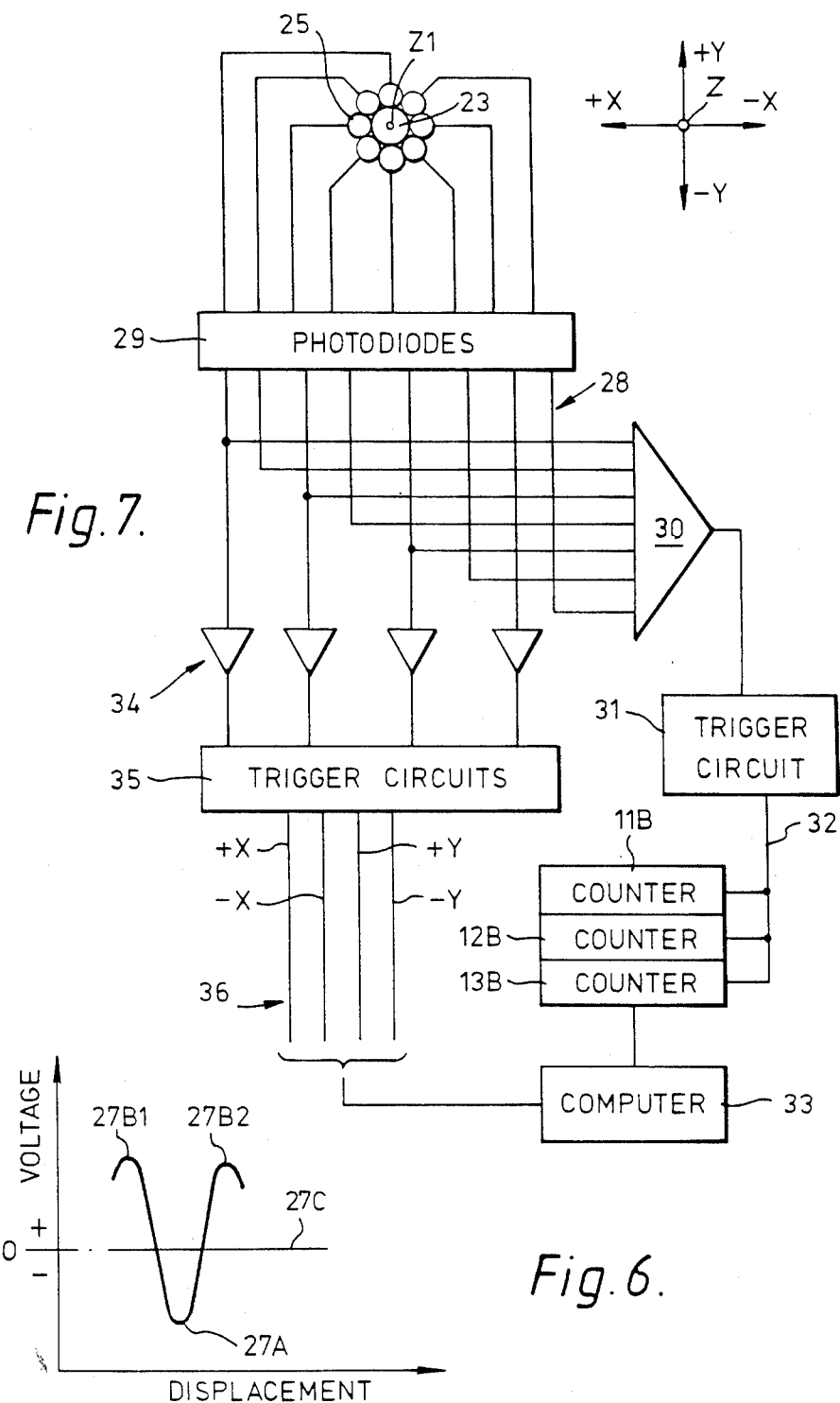

METHOD OF AND DEVICE FOR MEASURING DIMENSIONS

This application is a continuation of application Ser. No. 06/474,599, filed as PCT GB82/00198, Jul. 7, 1982, published as WO83/00216, Jan. 20, 1983 now abandoned.

BACKGROUND OF THE INVENTION

This invention relates to a method of and a device for measuring dimensions of a workpiece in coordinate positioning apparatus. A typical such apparatus comprises a probe for sensing a surface of the workpiece, means for moving the probe relative to the workpiece so that the probe may be moved to any selected surface thereof, means operative during movement of the probe for continually measuring the position of the probe relative to a datum, and means for determining the instantaneous position of the probe responsive to a signal output by the probe when sensing said surface. Such apparatus is used for so-called universal measuring, that is, it is used for measuring workpieces of different shapes and sizes, and usually also for measuring internal as well as external dimensions. Universal measuring requires the probe to be versatile in the sense of being able to sense surfaces to a significant extent regardless of their orientation. Also, it is often a requirement to move the probe from one surface to the next under automatic control and at great speed.

A known probe senses a surface by engaging it with a mechanical stylus. The stylus has a spherical end which, by viture of its spherical shape, can readily engage a surface lying at any angle, within a relatively large range, relative to the stylus. Therefore, for many typical operations it is not necessary to change the orientation of the stylus to suit the orientation of the surface. However, when the mechancial stylus is moved towards a first surface to be measured, the stylus must be halted substantially when it engages the first surface. Thereafter the stylus must be withdrawn from the first surface and, when determining the route of the stylus to the next surface to be measured, care must be taken for the stylus to avoid any obstructing projection defined by the first surface and an adjacent second surface lying at an angle thereto. The avoidance of such projections tends to slow down the operation of the apparatus especially when it is desired to make a large number of measurements automatically and at high speed.

SUMMARY OF THE INVENTION

The method according to the invention overcomes or reduces this difficulty in that it is not necessary to halt the probe in order to avoid the projection defined by the first and second surfaces because the probe housing passes clear of the projection. The method is particularly useful if there are a number of first surfaces defined at the sides of recesses in a relatively flat second surface. In that case it is merely necessary to pass the probe housing across the second surface at a small distance therefrom and the first surfaces are measured as the probe moves.

The device according to the invention is particularly useful for carrying out the method of the invention. The axisymmetrically convergent radiation provides for radiation having the same angle to the axis all round the axis so that, within the operating range of the device, at least some of the radiation will intersect a first surface regardless of the orientation thereof.

Examples for carrying out the invention will now be described with reference to the accompanying drawings wherein:

BRIEF DESCRIPTION OF THE DRAWINGS

FIG. 2 is an enlarged sectional detail of FIG. 1 and shows a sensing device or probe according to one embodiment of the invention embodied in the machine;

FIG. 3 is an enlarged view on the line III—III in FIG. 2;

FIG. 4 is an enlarged detail of FIG. 2 showing a different operational position;

FIG. 5 is a view in the direction of the arrow V in FIG. 4;

FIG. 6 is a diagram of light intensity or voltage as related to displacement of the probe;

FIG. 7 is a system diagram;

DESCRIPTION OF THE PREFERRED EMBODIMENTS

Figure 1:
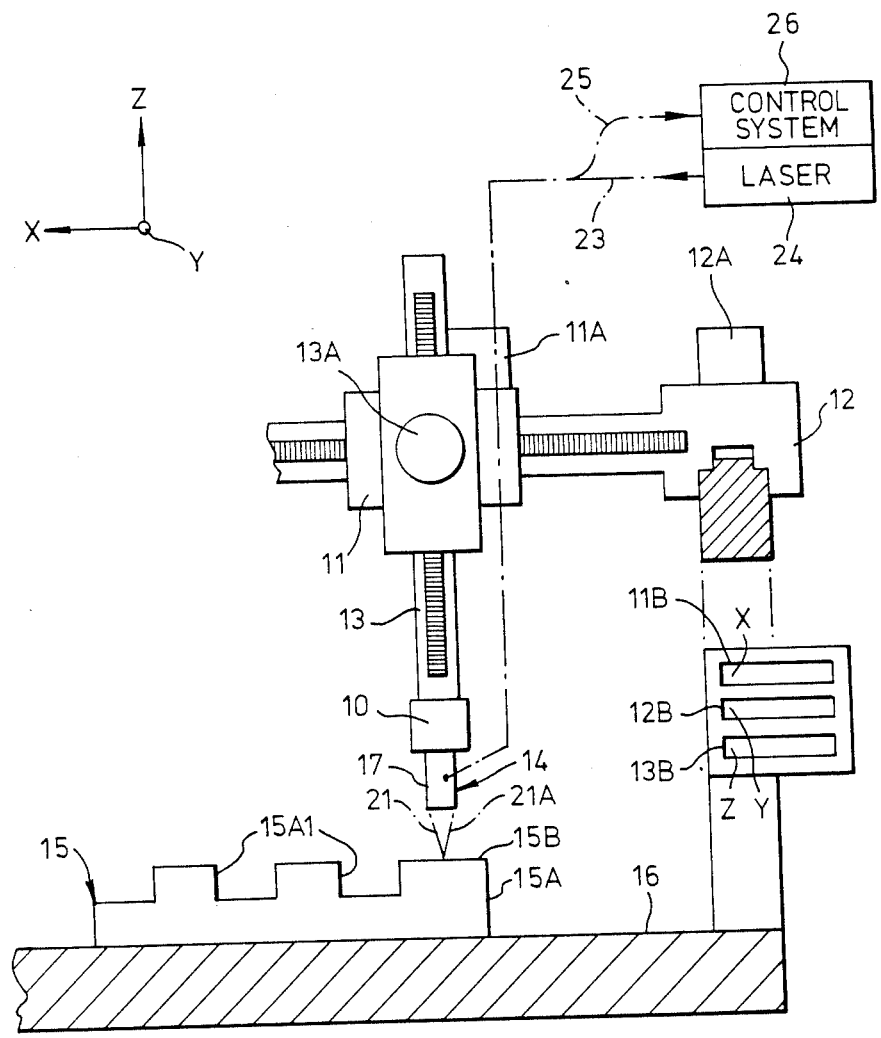
FIG. 1 is a diagrammatic elevation of a coordinate measuring machine including a probe according to the invention.

Referring to FIG. 1, the measuring machine has a head 10 supported for movement in the three dimensions X,Y and Z of the orthogonal coordinate system by respective carriages 11,12,13. The head has secured thereto a probe 14 for sensing the location of surfaces of a workpiece 15 supported on a table 16. The carriages 11,12,13 are adapted to be driven in the directions X,Y or Z by respective motors 11A,12A or 13A and the movement of the carriages, and thereby the movement of the probe, is measured relative to a pre-selected datum by electronic measuring devices, known per se, having outputs which are transmitted to continuous counters 11B,12B,13B showing the measuring output pertaining to the respective carriages.

The probe 14 (FIG. 2) has a housing 17 connected to the head by a spigot 18 and containing a converging optical system or lens 19 for collecting a divergent cone 20 of incident light and producing a convergent cone 21 of light. The cone 20 emerges from a source being the output end 23A of an emitter light guide 23 secured to the housing 17. The optical system has an axis Z1 which is also regarded as the axis of the probe and lies, in the present example, in the Z direction. The cones 20, 21 are symmetrical about the axis Z1.

The end portion of guide 23 adjacent the output end 23A is concentric with the axis Z1. The light guide 23 is led from the housing 17 to a light source, e.g. a laser 24 (FIGS. 1,2) mounted on stationary structure, the light guide itself being flexible to accommodate the movement of the head. However, the laser or any other suitable light source may be mounted directly on the head or within the housing. Receiver light guides 25 for reflected light are secured at one end to the housing in the same way as the guides 23. The output end 23A of the guide 23 and input ends 25A of the guides 25 lie substantially in a common plane 22 perpendicular to the axis Z1. The guides 25 are led to a control system 26 (FIGS. 1,7) on stationary structure.

FIG. 3 shows that there is one light guide 23 and eight light guides 25 grouped axisymmetrically around the guide 23, the end portions of the guides 25 adjacent the ends 25A being parallel to the adjacent end portions of the guide 23. It is preferably to have at least four guides 25, that is, two such guides at diametrically opposite sides of the guide 23 and lying in the XZ plane and two guides 25 correspondingly arranged in the YZ plane. At the plane 22 the guides 25 must be directly adjacent the guide 23.

Since the guide 23 may be of relatively small diameter, e.g. of the order of 0.05 millimeter, the end 23A provides what is virtually a point source of light, the "point" being defined by the area within the perimeter, denoted P (FIGS. 2,3) of the end 23A. The angle of divergence of the cone 20 is determined by the greatest angle of internal reflection of the guide 23. The system 19 produces at the apex of the cone 21, an image 23B of the end 23A. The direction of the side of the cone 21 is denoted 21A.

In order to ensure satisfactory illuminating power from the relatively small region within the perimeter P, the laser 14 is connected to the guide 23 by a light intensifying means which in this case is simply a cone 24A optically connected to the laser by a lens 24A.

If a surface 15B of the workpiece 15 perpendicular to the axis Z1 (FIG. 2) coincides with the image 23B then light reflected from the surface 15B falls onto the output end 23A within the perimeter P, and no reflected light falls on the guides 25. However, if the surface 15B is situated at positions 15B1 or 15B2 offset from the image 23B in the direction of the axis Z1, the area illuminated by the cone 21 is a circle of larger diameter than that of the image 23B and light is reflected from the surface 15A, e.g. by rays 25B, on to the input ends 25A of the guides 25 and is thus transmitted to the control system 26.

If a surface 15A of the workpiece 15 parallel to the axis Z1 lies at the image 23B (FIG. 4), i.e. lies on the axis Z1, only one half of the cone 21 can reach the surface 15B. Nevertheless, that light is concentrated at a half of the image 23B and light reflected from the surface 15A falls primarily on the output end 23A, no significant light falling on to the input ends 25A. However, if as shown in FIG. 4, the surface 15A is offset from the image 23B in the direction perpendicular to the axis Z1, the area illuminated by the cone 21 is limited by a hyperbola H (FIG. 5) with the light mainly concentrated at the head of the curve, and reflected light reaches the output ends 25A, e.g. by rays 25C.

The output of any one of the output light guides 25 follows a curve 27 (FIG. 6) relating light intensity to displacement. The curve 27 has a minimum 27A when the surface 15A or 15B lies at the image point 23B, the curve rising to respective maxima 27B1, 27B2 depending on the side of the image 23B to which the surface 15A or 15B is displaced.

The control system 26 shown generally in FIG. 1 is shown in greater detail in FIG. 7 wherein the guides 25 are connected to respective photodiodes 29 whose voltage output 28 also follows the curve 27. The photodiodes are connected to a summing amplifier 30 whose output is connected to a trigger circuit 31 such that a pulse signal on line 32 is produced when the voltage crosses a zero bias line 27C on the curve of FIG. 6, about half-way between the point 27A and the level of the points 27B1, 27B2. The signal on line 32 is connected to the counters 11B, 12B, 13B in a manner known per se, to transmit the instantaneous counter reading to a computer 33.

The outputs of four of the output guides 25, being guides lying on X and Y axes (FIG. 7), are connected to individual amplifiers 34 and trigger circuits 35 having outputs 36. the outputs 36 are designated +X, −X, +Y, −Y according to their relationship to the respective sides of the axis Z1. The outputs 36 (+X,−X) are connected to the computer 33 and to the counter 1B such that either signal 36 (+X) or 36 (−X) connects the counter 11B to the computer but the designations (+X) and (−X) are read separately by the computer to determine the direction in which the surface 15B faces. The signals 36 (+Y) and 36 (−Y) are correspondingly related to the computer 33 and to the counter 12B.

The method of measuring the surface 15A may be described as follows. Firstly, the carriage 13 (FIG. 1) is lowered for the image 23B to lie below the level of the surface 15B but for the housing 17 to remain above that level. Assuming the probe to be initially to the right of the surface 15A, the probe is moved to left and in the X direction. It will be clear that during that movement the housing 17 moves in the plane XZ intersecting the surfaces 15A, 15B, and in the direction X across the surface 15B, and the housing is so positioned that the direction 21A (FIG. 4) defining the side of the cone 21 intersects the surface 15B. Then, given that the carriage 13 is so positioned that the housing 17 itself is clear of the surface 15B, the probe 14 can be moved in the directin X without danger of the housing being damaged by collision with the workpiece.

In view of the axisymmetry of the cone 21 the probe can sense in all directions around the axis Z1 and therefore can sense any surface parallel or inclined to that axis regardless of the direction in which the surface 15A faces.

As shown in FIG. 1 the workpiece has a number of recesses defining surfaces 15A1 whose orientation is similar to that of the surface 15A, and it will be clear that the surfaces 15A1 can be measured simply by moving the housing 17 across the surface 15B in a continuous motion. In other words, there is no need for the machine to be stopped at the respective surfaces 15A1. This is of particular advantage, for example, if one has to measure the spacing of a large number of holes in a plate.

The carrying out of the method described requires that the distance between image 23B and the housing is relatively large so that the image 23B can be located useful distance below the surface 15B. To satisfy this requirement, the lens 19 is arranged in the housing 17 at its extremity 17A (FIGS. 2,4) intended to face the workpiece. However a short shroud 17B may be provided to protect the lens in case of inadvertent collision between the housing and the workpiece.

Figure 8:
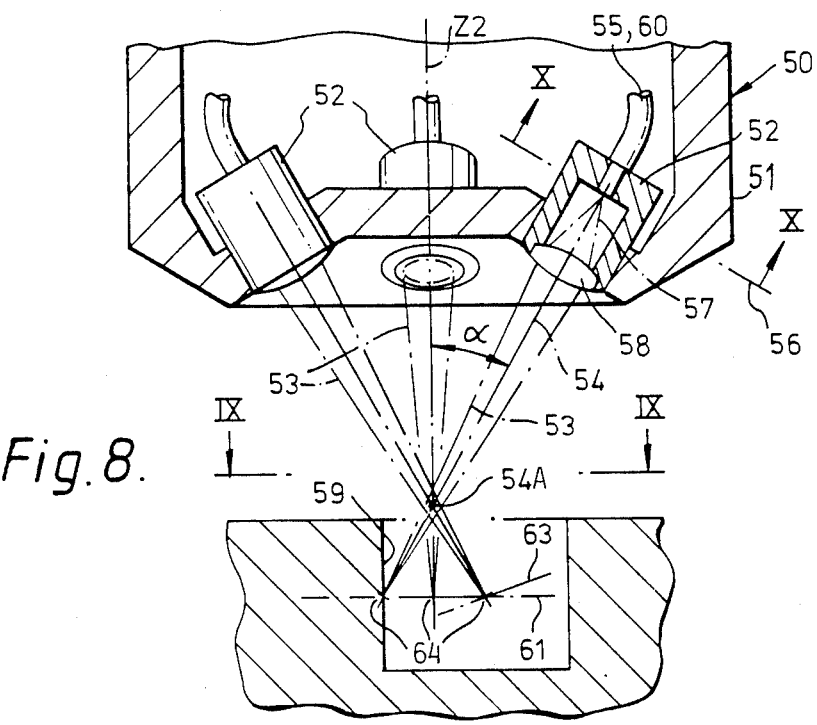
FIG. 8 is a sectional elevation of a second embodiment of the probe according to the invention
Figure 9:
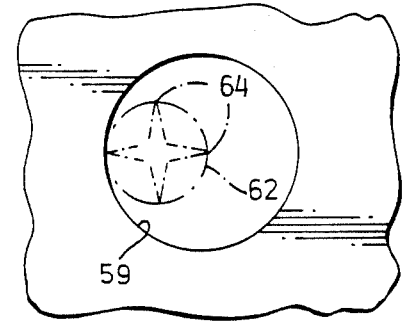
FIG. 9 is a view on the line IX—IX in FIG. 8.
Figure 10:
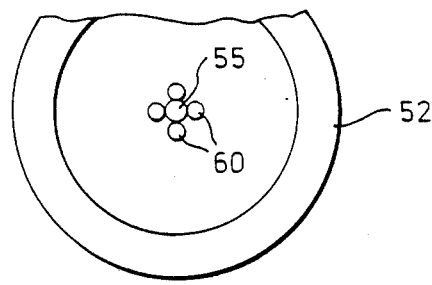
FIG. 10 is an enlarged section on the line X—X in FIG. 8.

Referring to FIGS. 8 to 10, there is shown a probe 50 comprising a housing (support) 51 having a primary axis Z2 and supporting a plurality of relatively smaller housings or units 52 each adapted to emit a convergent light beam 53 having a secondary axis 54. The units 50 are arranged symmetrically around the axis Z2. The axes 54 each lie at an angle α to the axis Z2 and intersect at a point 54A. Each unit has a light guide 55 (FIG. 10) ending at a plane 56 and adapted to emit a divergent cone 57 (FIG. 8) of light onto a lens 58 which directs the light by way of the beam 53 to a focus 64. Light reflected from the focal area, as by a surface 59 parallel to the axis Z2, is substantially returned to the end of the guide 55. If the surface 59 does not coincide with the focus 64 the reflected light is spread to the region surrounding the perimeter of the guide 55 to be received by receiver light guides 60 (FIG. 10). The guides 60 lead the reflected light to a control system having means for producing a signal responsive to the reflected light attaining a predetermined intensity. It will be seen that the emitter and receiver system and the signal generation pertaining to the respective units 52 are essentially the same as those described with reference to FIGS. 2,3 and 6,7.

The foci 64 are situated at a plane 61 lying a small distance to the side of the point 54a remote from the housing 51 so that the foci 64 lie in effect on a common circle 62 (FIG. 9) concentric with the axis Z2. This arrangement makes it possible for the probe 50 to be arranged to discrimminate between the receiver outputs of the respective units 52. This is not only useful for the purpose of detecting the direction in which the reflecting surface faces but also it has the advantage that it concentrates reflection from a particular surface into a particular unit 52 and avoids or reduces interference by stray reflections. FIG. 8 shows four units 52 but it will be clear that a greater number may be introduced to maximise the density of foci in the circle 62. It will be seen that the distribution of the foci over the circle 62. and the inclination of the axes 54 relative to the axis Z2, makes it possible to sense surfaces whose orientation may vary over a very wide range. It is possible not only to sense in directions alll around the axis Z2, but also the surfaces may lie at any angle to the axis Z2, e.g. as shown at 63, so long as the surface substantially faces at least one of the lenses 58.

The method described with reference to the probe 14 applies equally to the probe 50.

I claim:

1. Apparatus for detecting surface characteristics of an object, comprising:
    a support having a first axis;
    a plurality of units mounted around said first axis, each unit having a second axis lying at a given angle to the first axis and comprising:
        a light emitter having an emitter end for emitting light along the second axis;
        means for converging the emitted light to a focus on the second axis at a position spaced from the corresponding foci of the other of said units;
        light receiving means lying adjacent to said emitter end so that, when said apparatus in in operation, the object is illuminated by the emitted light and light is reflected from the object to illuminate said light receiving means; and
    detecting means for detecting different illumination on the light receiving means of the respective units to thereby detect a surface characteristic.

2. Apparatus according to claim 1, wherein said units are positioned so that the second axes converge from said units to a common region.

3. Apparatus according to claim 2, wherein the second axes diverge from said common region in a direction away from said units thereby defining a divergent region, and wherein the respective foci of the units lie in said divergent region.

4. Apparatus according to claim 2, wherein the foci of the respective units lie on a circle.

5. Apparatus according to claim 1, wherein the foci of the respective units lie in a common plane transverse to the first axis.

6. Apparatus according to claim 1 wherein the second axes of said units intersect at a common point on the first axis and the respective foci of the units are situated remotely from said common point thereby to lie in a circle concentric with respect to said first axis.

7. Apparatus for detecting an edge between a first and a second surface of an object, comprising:
    a housing having a first axis;
    a plurality of units mounted symetrically around said fist axis, each unit having a second axis lying at a given angle to the first axis and comprising:
        a light emitter having an emitter end for emitting light along the second axis;
        means for converging the emitted light to a focus on the second axis; and
        a plurality of light receivers each having a respective receiving end, the receiving ends lying adjacent to the emitting end in a plane transverse to the second axis and being spaced apart about that axis so that, when said apparatus is in operation, the first surface of the object is illuminated by the emitted light and light is reflected from the first surface to illuminate said receiving ends; and
    detecting means for detecting uniform illumination on the receiving ends of the respective units to thereby detect the presence of an edge between the first and second surfaces;
    wherein the second axes of said units intersect at a common point on the first axis and the respective foci of the units are situated remotely from said common point thereby to lie in a circle concentric with respect to said first axis.

* * * * *